United States Patent [19]
von Hoessle

[11] Patent Number: 5,051,830
[45] Date of Patent: Sep. 24, 1991

[54] DUAL LENS SYSTEM FOR ELECTRONIC CAMERA

[75] Inventor: Wolfgang von Hoessle, Hohenbrunn-Riemerling, Fed. Rep. of Germany

[73] Assignee: Messerschmitt-Bolkow-Blohm GmbH, Fed. Rep. of Germany

[21] Appl. No.: 562,929

[22] Filed: Aug. 6, 1990

[30] Foreign Application Priority Data

Aug. 18, 1989 [DE] Fed. Rep. of Germany ....... 3927334

[51] Int. Cl.⁵ .............................................. H04N 5/30
[52] U.S. Cl. .................................... 358/209; 358/229; 358/227; 358/109; 250/330
[58] Field of Search ............... 358/209, 229, 227, 109; 350/437, 442, 445; 250/330, 332

[56] References Cited

U.S. PATENT DOCUMENTS 4,199,785 4/1980 McCullough et al. ............. 358/180

FOREIGN PATENT DOCUMENTS 2143120 3/1973 Fed. Rep. of Germany .
3144952 5/1983 Fed. Rep. of Germany .
3435634 4/1986 Fed. Rep. of Germany .

OTHER PUBLICATIONS

Pages from a manual entitled: "Filter Faszination", pp. 80–81, Apr., 1978.

Primary Examiner—Howard W. Britton
Assistant Examiner—Tuan V. Ho
Attorney, Agent, or Firm—Evenson, Wands, Edwards, Lenahan & McKeown

[57] ABSTRACT

A device is provided for the real-time picture transmission in the case of a guided missile which is connected with a ground guiding station by way of a beam waveguide. The picture transmission takes place using a camera arranged on a platform which has objective lenses of different focal lengths. The camera is constructed as a double focal length camera with a single lens system member having a short focal length section integrated in the center of the surrounding lens section for the long focal length. A common support is provided for the picture raise of both focal lengths. The single electronic camera system is provided for both picture arrays and includes an electronic change over system for the respective required focal length of arrays to be viewed.

15 Claims, 1 Drawing Sheet

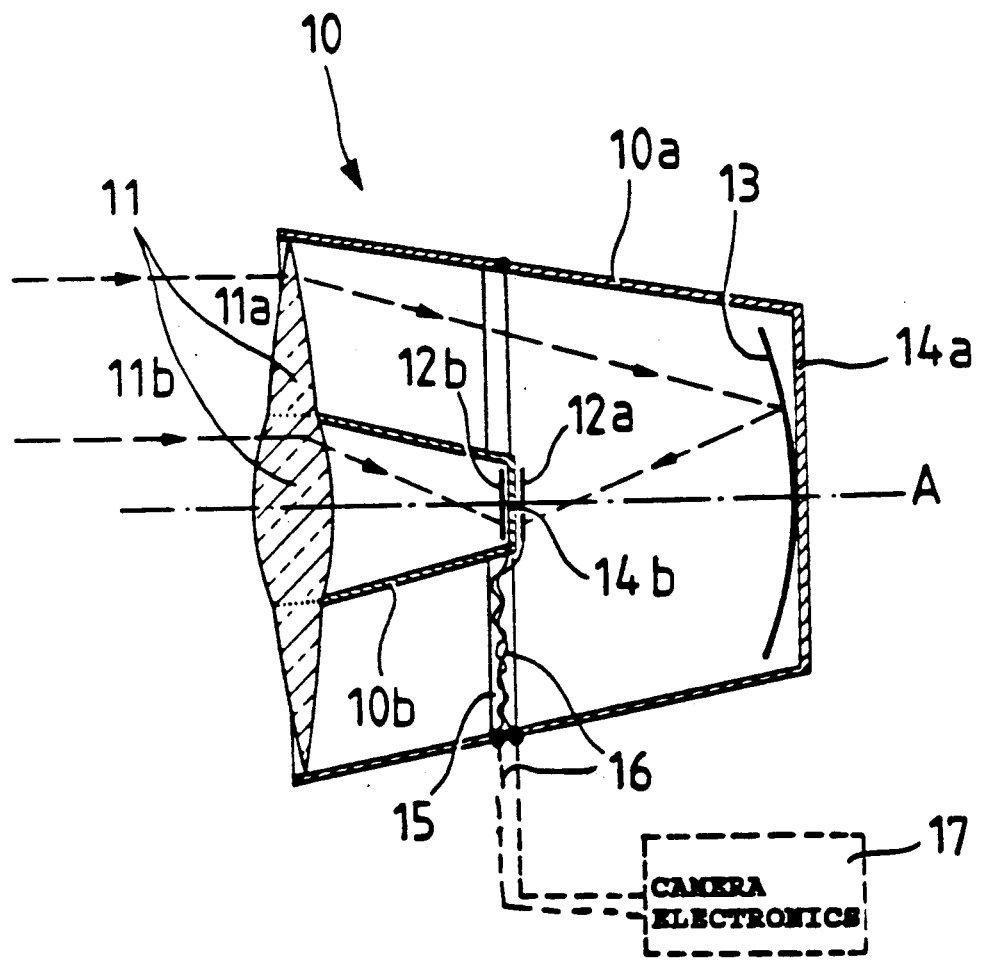

DUAL LENS SYSTEM FOR ELECTRONIC CAMERA

BACKGROUND OF THE INVENTION the case of guided missiles, which are connected with a ground facility by means of a beam waveguide, it is known to carry out a real-time picture transmission by means of a camera. In addition to the picture data, as a result of the high bandwidth, measuring values of the instrumentation are at the same time transmitted by way of the beam waveguide from the guided missile FK to the ground facility as well as, in the opposite direction, the required control and switching commands for the guiding of the guided missile are transmitted from the ground.

It is the purpose of constructions of this type that the person firing the missile, by means of the TV camera for daytime viewing or the IR camera for nighttime viewing, can navigate the guided missile FK into a specified target area and there can detect, recognize, identify and combat targets existing there. Since the flight into the target area takes place mainly according to map information with a simultaneous support by the gyroscopes, a field of view which is as large as possible is advantageous for the purpose of orientation during navigation because it increases the chances of detecting prominent points in the terrain.

Tests have shown that, in the Central European terrain at flight altitudes between 150 m and 250 m, prominent structures of the terrain—such as roads, rivers, forests, buildings, etc. —can be recognized at distance ranges of from 3 to 7 km, and a width of the field of view of approximately 1,500 m in the case of a distance of 5 km or 1,000 m in the case of a distance of 3 km is sufficient for the purpose of orientation. In the case of a ⅔-inch target—thus a CCD-array of a diagonal length of 11 mm—this corresponds to a focal length of an objective of approximately 28 mm.

However, the person firing the missile, for an early target recognition and identification, requires relatively large coverages which naturally can be reached easily only by means of long focal lengths of the objective and offer correspondingly small and clear fields of view. In the case of the above-mentioned target or CCD-array, this means that the focal length would have to be longer than 80 mm in which case, however, in the case of long focal lengths, the stabilizing quality of the camera must be taken into account and finally determines the limits of the selection of the focal length.

In this respect, it has been suggested that a compromise be made for the two tasks—navigation and early target recognition —and a mean focal length of 50 mm be selected. This means, however, that, for being sufficiently successful, the two tasks can be solved only in extremely good viewing conditions, with a person firing the guided missile who is highly trained with respect to map navigation and target recognition and who reacts quickly.

In order to ensure that the mission is carried out successfully also in worse viewing conditions, for example, in high atmospheric humidity and with a hazy view, or at dusk or dawn, or under rainy or dusty conditions, it has been suggested to use a motor-driven zoom objective with a focal length of 28 to 100 mm. However, the results were not as good as expected because a zoom objective of this type not only requires a relatively large amount of space, it is also heavy and expensive and—which is important—much too slow with respect to its use. Furthermore, this type of an objective, in the case of changes of the focal length, also has corresponding changes of length and thus shifts of the center of gravity which results in considerable problems with respect to the integration on the stabilizing platform.

Also, additional devices are required in this case—such as position indicators—for informing the picture tracker and the guiding computer in the ground facility concerning the respective adjusted enlarging factor of the picture, since picture displacements enter the guiding law as angular rotations, and the angular rotation is a function of the enlarging factor.

It is an object of the present invention to provide a device of the initially mentioned type which is free of the above-mentioned disadvantages of the state of the art and ensures a real-time picture transmission which changes over extremely fast from one picture to the next, requires no focussing and axis harmonization during the mission and for the change-over no longer has any mechanically movable parts in the camera.

This object is achieved according to preferred embodiments of the invention by means of an arrangement for the real-time picture transmission in the case of a guided missile (FK) which is connected with a ground guiding station by way of a beam waveguide, wherein the picture transmission takes place by means of a camera arranged on a platform and having objectives of different focal lengths, wherein the camera is constructed as a double focal length camera in which partial lens systems for a short focal length and a long focal length form a single structural double lens system member, the lens part for the short focal length being integrated in the center of the lens part for the long focal length, wherein picture arrays assigned to both focal lengths are arranged on a common support, the overall length of the long focal length being shortened, by means of a reflecting mirror, and wherein only one electronic camera system for both picture arrays is arranged with an electronic changeover to the respective required focal length.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic sectional view of a real time picture transmission arrangement for guided missiles constructed in accordance with a preferred embodiment of the invention.

DETAILED DESCRIPTION OF THE DRAWINGS

In the shown embodiment, the TV camera or IR camera is conceived as a so-called double focal length camera 10, in which the two lens systems for the short focal length 11b and for the long focal length 11a form a so-called double lens system 11. In this case, the lens system for the short focal length 11b is integrated in the center of the lens system for the long focal length 11a. Each of the partial lens systems 11a and 11b is equipped with a housing 10a and 10b, the housing 10b of the short focal length partial lens system 11b being disposed in the interior of the housing 10a of the long focal length partial lens system 11a, and the former either being connected with the latter by webs 15, or both housings 10a and 10b being connected with the lens system 11 itself.

The bottom part 14b of the conically extending interior housing 10b, which forms the end of the shell of the housing 10b enclosing the partial lens system 11b, on its interior side, carries the picture array 12b assigned to this system and, on its exterior side, the picture array 12a assigned to the partial lens system 11a for the long focal length. The bottom part 14a of the also conically extending exterior housing 10a—as shown in the drawing—on its interior side, carries the reflecting mirror 13 for the bending and concentrating of the beam of the long focal length partial lens system 11a on the picture array 12a. As a result, a significant shortening of the overall length of the long focal length objective is made possible, and for both picture arrays 12a and 12b, only a single support is required, and in addition, also only one electronic camera system 17 is required for both picture arrays.

This electronic camera system 17 is externally arranged separately from the objective and the picture array and has an electronic change-over device for the respective requested picture. This change-over from one picture to the next—thus, from a large field of view for the navigation to the small field of view for target recognition and identification—may be carried out extremely fast as a result of the suggested measures, specifically during a time period of 1/50 s after each field. The focussing and axis harmonization of both pictures takes place during the manufacturing of the device, and mechanically moved parts are no longer required. By means of a suitable selection of the diameters of both lens systems, it is possible to match the light intensity for both picture arrays 12a, 12b. The feed lines 16 to these arrays have the same length and are located at the same site.

As a result of the now achieved short overall length of the device, the camera is permitted to have larger swivel angles. The exposure in the electronic camera system 17 is preferably regulated by means of an electronic shutter (not shown), and it is also recommended that the imaging factors for the calculating of the guiding and control commands be stored in the computer of the ground facility as constants.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A device for the real-time picture transmission in the guided missile (FK) which is connected with a ground guiding station by way of a beam waveguide, wherein the picture transmission takes place by means of a camera arranged on a platform and having objectives of different focal lengths, wherein the camera is constructed as a double focal length camera in which partial lens systems for a short focal length and a long focal length form a single structural double lens system member, the lens part for the short focal length being integrated in the center of the lens part for the long focal length, wherein picture arrays assigned to each focal length are arranged on a common support, the overall length of the long focal length being shortened, by means of a reflecting mirror, and wherein only one electronic camera system for both picture arrays is arranged with an electronic change-over to the respective required focal length.

2. A device according to claim 1, wherein the camera is a TV camera.

3. A device according to claim 1, wherein the camera is an IR camera.

4. A device according to claim 1, wherein an interior housing for the short focal length partial lens system of the double lens system is connected by way of webs with the housing of the long focal length partial lens system.

5. A device according to claim 1, wherein a bottom part of a conically extending interior housing carries the picture array on the interior side of the housing for the short focal length partial lens system and, at its exterior side, carries the picture array for the long focal length partial lens system.

6. A device according to claim 4, wherein a bottom part of a conically extending interior housing carries the picture array on the interior side of the housing for the short focal length partial lens system and, at its exterior side, carries the picture array for the long focal length partial lens system.

7. A device according to claim 5, wherein the bottom part of the conically extending exterior housing carries the reflecting mirror at its interior side for the bending and concentrating of the beam of the long focal length partial lens system onto the picture array.

8. A device according to claim 6, wherein the bottom part of the conically extending exterior housing carries the reflecting mirror at its interior side for the bending and concentrating of the beam of the long focal length partial lens system onto the picture array.

9. A device according to claim 7, wherein the exterior housing and the interior housing are connected with the double lens system to form a single structural unit.

10. A device according to claim 1, wherein the regulating of the exposure in the electronic camera system takes place by means of an electronic shutter.

11. A device according to claim 4, wherein the regulating of the exposure in the electronic camera system takes place by means of an electronic shutter.

12. A device according to claim 5, wherein the regulating of the exposure in the electronic camera system takes place by means of an electronic shutter.

13. A device according to claim 8, wherein the regulating of the exposure in the electronic camera system takes place by means of an electronic shutter.

14. A device according to claim 13, wherein the camera is a TV camera.

15. A device according to claim 13, wherein the camera is an IR camera.

* * * * *